United States Patent
Leisenheimer et al.

(10) Patent No.: US 11,644,342 B2
(45) Date of Patent: May 9, 2023

(54) METHOD OF DETERMINING A POSITION OF A FIRST OBJECT IN A POSITIONING SYSTEM, A POSITIONING SYSTEM AND A COMPUTER PROGRAM

(71) Applicant: Infineon Technologies AG, Neubiberg (DE)

(72) Inventors: Stephan Leisenheimer, Deisenhofen (DE); Richard Heinz, Munich (DE); Hyun Jeong Kim, Seoul (KR); Joo Il Park, Sungnam (KR)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/370,052

(22) Filed: Jul. 8, 2021

(65) Prior Publication Data

US 2022/0018686 A1   Jan. 20, 2022

(30) Foreign Application Priority Data

Jul. 15, 2020 (DE) .......................... 102020118723.8

(51) Int. Cl.
  *G01D 5/14*    (2006.01)
  *G06T 7/70*    (2017.01)
  *G06T 7/80*    (2017.01)

(52) U.S. Cl.
  CPC ............... *G01D 5/145* (2013.01); *G06T 7/70* (2017.01); *G06T 7/80* (2017.01)

(58) Field of Classification Search
  CPC .......... G01D 5/145; G01D 5/125; G01D 5/14; G01D 5/142; G01D 5/147; G01D 2205/18; G05F 1/635; G01B 7/003; G01B 7/14; G02B 5/005; G02B 7/023; G02B 27/646; G03B 13/36; G06T 7/80; G06T 7/70; G06M 1/274; G06G 7/162; G01R 33/00; G01R 33/02; G01R 33/07; G01R 33/077; G01R 21/08; G01R 15/20; G01R 15/202; G01R 33/0023; G01R 33/06; G11B 7/0935; H03B 15/00; H04N 5/2254; H04N 5/2253; H04N 5/23287; G05B 2219/34017;

(Continued)

(56) References Cited

U.S. PATENT DOCUMENTS

| | | | | |
|---|---|---|---|---|
| 5,177,640 A | * | 1/1993 | Grassens | G11B 7/093 |
| 6,771,078 B1 | * | 8/2004 | McCauley | G01R 31/58 |
| | | | | 324/538 |
| 2014/0266158 A1 | | 9/2014 | Zwijze et al. | |

(Continued)

FOREIGN PATENT DOCUMENTS

| | | |
|---|---|---|
| DE | 102007035498 A1 | 1/2009 |
| EP | 3522517 A1 | 8/2019 |

*Primary Examiner* — Daniel R Miller
*Assistant Examiner* — Eric Sebastian Von Wald
(74) *Attorney, Agent, or Firm* — Harrity & Harrity, LLP

(57) ABSTRACT

A method of determining a position of a first object includes receiving a first component and a second component of a vector field jointly generated by the first object and by a second object. The method further includes using the second component of the vector field to provide a compensation quantity indicating a contribution of the second object to the first component of the vector field. Further, the method includes determining the position of the first object using the first component of the vector field and the compensation quantity.

18 Claims, 4 Drawing Sheets

(58) Field of Classification Search
CPC ....... G05B 2219/41322; G06F 15/8053; G06F 17/16; G06F 9/30036; G06E 1/045
See application file for complete search history.

(56) References Cited

U.S. PATENT DOCUMENTS

2016/0231528 A1* 8/2016 Wong ................... G03B 3/10
2020/0064156 A1* 2/2020 Hirano .................. G01D 5/147

* cited by examiner

METHOD OF DETERMINING A POSITION OF A FIRST OBJECT IN A POSITIONING SYSTEM, A POSITIONING SYSTEM AND A COMPUTER PROGRAM

RELATED APPLICATION

This application claims priority to German Patent Application No. 102020118723.8, filed on Jul. 15, 2020, which is incorporated herein by reference in its entirety.

FIELD

Examples relate to a method of determining a position of a first object in a positioning system, a positioning system, and a computer program.

BACKGROUND

Cameras or microscope systems may provide optical zoom enabling an observation of magnified image sections with consistent resolution. The implementation of optical zoom often requires a movement of lenses within an optical system. By changing the position of lenses, focal lengths within the optical system can be adjusted.

An efficient implementation of optical zoom often requires a precise detection of the positions of movable lenses. Common positioning systems can detect positions of e.g. optical elements mechanically. As mechanical solutions are space consuming, they are often not suitable for several applications such as for flat smartphone cameras. Other positioning systems may comprise potentiometers enabling to map a change in distance into a change in resistance or voltage. As potentiometers cannot operate contactless, abrasion may cause a reduction of the technical lifetime of the positioning system.

There appears to be a demand to improve positioning systems to determine the position of objects.

SUMMARY

This objective may be achieved by the subject matter of any of the claims.

An embodiment of a method of determining a position of a first object in a positioning system includes receiving a first component and a second component of a vector field jointly generated by the first object and by a second object. The method further includes using the second component of the vector field to provide a compensation quantity indicating a contribution of the second object to the first component of the vector field. Further, the method includes determining the position of the first object using the first component of the vector field and the compensation quantity. The compensation quantity can be used as correction for the first component of the common vector field. By this means, a corrected first component can be determined. The corrected first component may correspond to a vector field of the first object without crosstalk of a vector field of the second object. The corrected first component can be used to determine the position of the first object without the result being falsified by the contribution of the second object to the vector field.

An embodiment of a positioning system includes a first magnet and a second magnet jointly generating a magnetic field. The positioning system further includes a first optical element connected to the first magnet and a second optical element connected to the second magnet. Further, the positioning system includes at least one sensor configured to detect a first component and a second component of the magnetic field. The first magnet and the second magnet can be used for determining a position of the first optical element or the second optical element in the positioning system. Depending on the positions of both magnets, a magnetic field is jointly generated. While both magnets jointly generate a magnetic field, which is a vector field having three components, the first and second component of the magnetic field detected by the at least one sensor may be sufficient to determine at least the position of one magnet and, hence, of the associated optical element.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
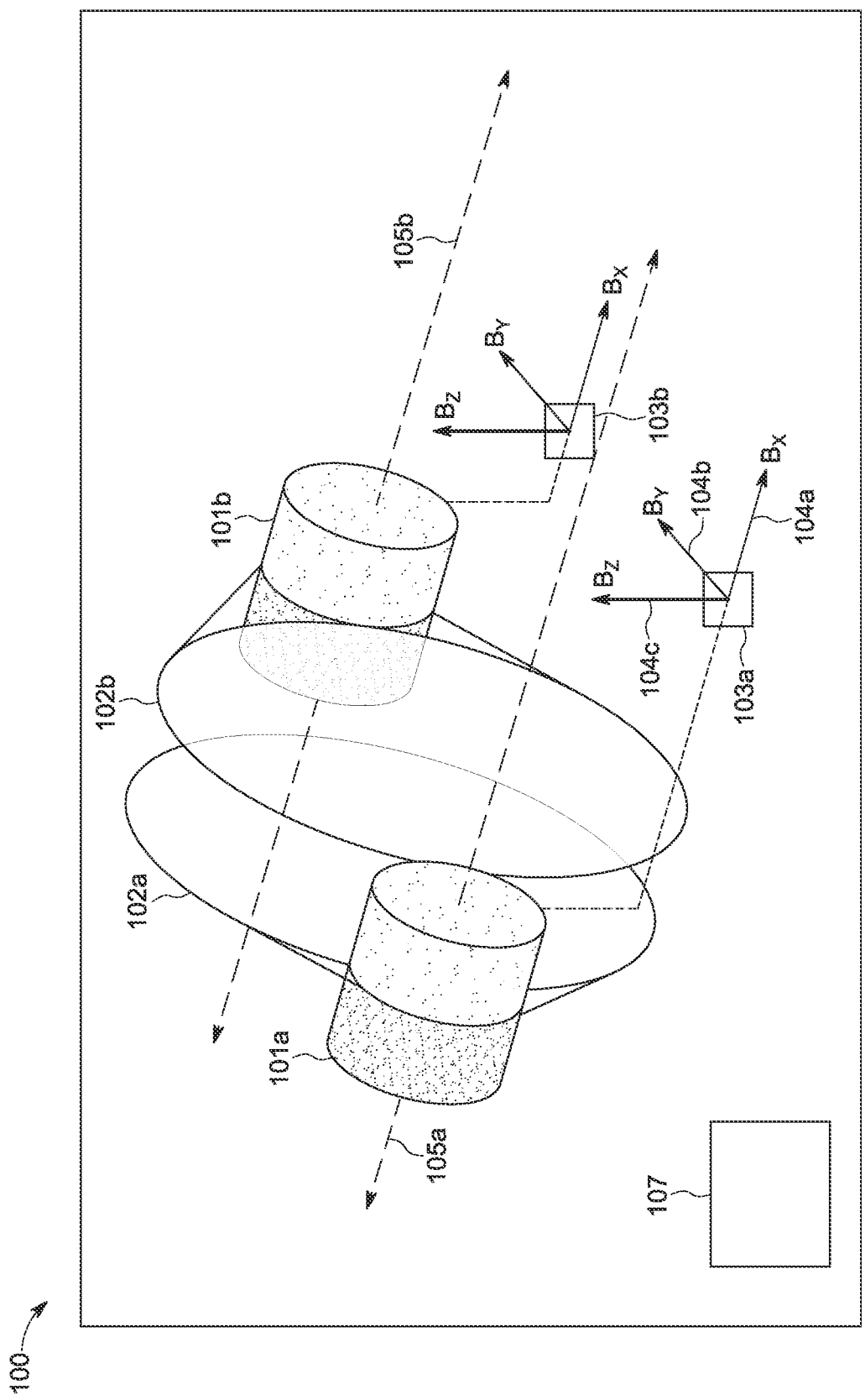
FIG. 1 illustrates an embodiment of a positioning system.

FIG. 1 shows an embodiment of a positioning system 100 with a first magnet 101a and a second magnet 101b jointly generating a magnetic field. A first optical element 102a is connected to the first magnet 101a and a second optical element 102b is connected to the second magnet 101b. The magnets 101a-b and the optical elements 102a-b can be arranged to be moveable in the positioning system. For example, the optical elements 102a-b can be rigidly connected to the magnets 101a-b, respectively. By this means, the optical elements 102a-b can move in parallel to the motion of the magnets 101a-b. The magnet 101a can move along an axis 105a and the magnet 101b can move along an axis 105b, as shown in FIG. 1. Further, the positioning system 100 comprises at least one sensor 103a configured to detect a first component 104a and a second component 104b of the magnetic field. In FIG. 1, the first component 104a is exemplarily labeled $B_x$ and the second component 104b is labeled $B_y$.

In FIG. 1, the sensor 103a is oriented such that the first component 104a can be parallel to the axis of motion of the first magnet 101a and the second component 104b can be perpendicular to the first component 104a. The first and second component 104a-b of the magnetic field detected by sensor 103a can be used for determining the position of the first magnet 101a and so the position of the first optical element 102a.

The positioning system 100 comprises another sensor 103b configured to detect the first component and the second component of the magnetic field at another position. The first and second component of the magnetic field detected by sensor 103b can be used for determining a position of the second magnet 101b and with that the position of the second optical element 102b. In another embodiment, a positioning system comprises only one sensor or more than two sensors configured to detect a first component and a second component of a magnetic field, respectively.

According to the shown embodiment, the at least one sensor 103a-b is a 3D Hall sensor. The 3D Hall sensor can enable to measure three components of the magnetic field simultaneously. By this means, positions of magnets can be determined.

Other embodiments may use others sensors than 3D Hall sensors such as one or several 2D Hall sensors, Anisotropic Magnet Resistance (AMR) sensors, Giant Magneto Resistance (GMR) sensors or others sensors suitable to detect at least the first and second component 104a-b of the magnetic field.

According to the embodiment, the first optical element 102a and the second optical element 102b are linearly movable in a predetermined direction. As exemplarily shown in FIG. 1, the predetermined direction is oriented parallel to axis 105a-b. Due to connection, the linear motion of the optical elements 102a-b can be defined by the linear motion of the magnets 101a-b. For connecting, magnets 101a-b can be e.g. glued on the optical elements 102a-b or can be screwed on a frame of the optical elements 102a-b. Other than rigid connections might be also suitable to be able to determine the positions of the optical elements 102a-b by the positions of the magnets 101a-b. In another embodiment, the linear motion of the magnets 101a-b can deviate from what is shown in FIG. 1 e.g. according to a shift or rotation of axis 105a or 105b.

In the shown embodiment, the optical elements 102a-b correspond to moveable lenses configured to change a zoom or focus of the positioning system 100. For example, the linear motion of the optical elements 102a-b can be used to change a focal length within a zoom system comprising the positioning system 100. Zoom systems may use one or more moveable lenses between two fixed lenses. By adjusting the position of the moveable lenses, a zoom or focus can be changed accordingly. The optical elements 102a-b can also move opposite to the predetermined direction if e.g. it is desired to reverse the zoom or generally to reduce the image section. In other implementations, the optical elements 102a-b may correspond to mirrors, apertures, prisms, filters or other types of components used for optics.

Figure 2:
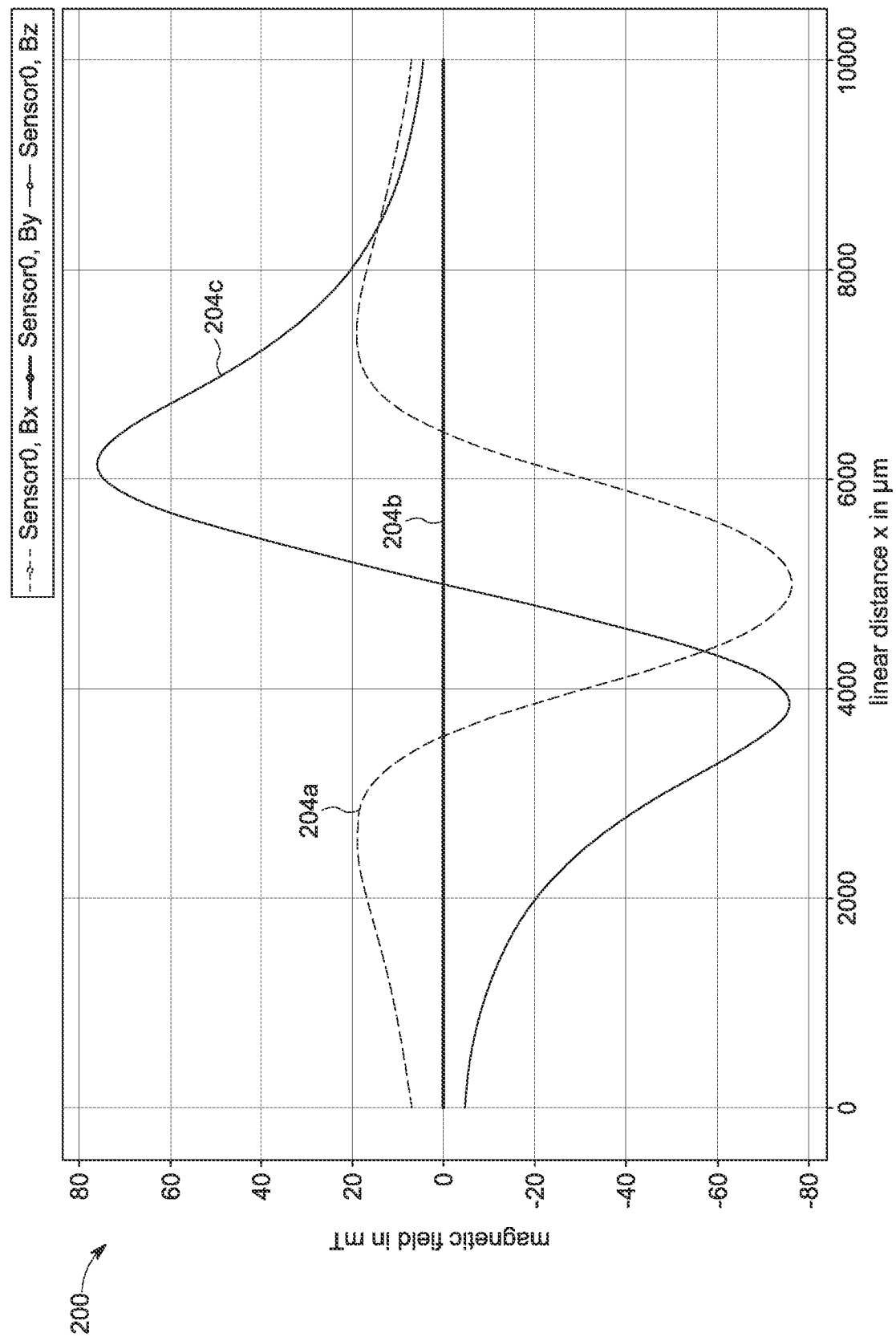
FIG. 2 illustrates an example of a calibration information of the first magnet.

In the shown embodiment, the at least one sensor 103a-b is displaced from the predetermined direction and oriented such that it is sensitive to a field component in the predetermined direction and to a field component perpendicular to the predetermined direction. As illustrated exemplarily, sensor 103a can be arranged e.g. downwards from axis 105a. In other implementations, the sensor 103a can be arranged upwards from axis 105a, on the other side of the magnet 101a or generally arranged and oriented in such a way that sensor 103a is sensitive to a field component in the predetermined direction and to a field component perpendicular to the predetermined direction. If the sensor 103a is displaced from the axis 105a according to FIG. 1 and if the magnetic field of the second magnet 101b is not considered, field components 204a-c might be given as shown in FIG. 2. The diagram may correspond to a calibration information 200 of the first magnet given by an ideal linear position measurement of sensor 103a without the crosstalk from magnet 101b e.g. given by a standard magnetic linear movement measurement.

The diagram shows that sensor 103a is sensitive to the field component 204a in the predetermined direction and to the field component 204c being perpendicular to the predetermined direction. For the given position and orientation according to FIG. 1, the sensor 103a may not be sensitive to the field component 204b if only the magnetic field of the first magnet 101a is considered.

In the given example, the field component 204a changes according to the position of the first magnet 101a relative to sensor 103a. Hence, the first component 104a of the magnetic field can be used to determine the position of the first magnet 101a. The field component 204c also changes according to the position of the first magnet 101a relative to sensor 103a. Hence, a third component 104c can be also used to determine the position of the first magnet 101a. The third component 104c, labeled $B_z$ in FIG. 1, can be additionally detected by sensor 103a.

In the given example, the field component 204b equals zero independent on the variable distance of the first magnet 101a. Hence, the second component 104b can be used to measure a magnetic field attributable to another magnet such as the second magnet 101b. By this means, the second component 104b of the common magnetic field can be used to determine a crosstalk from the second magnet 101b.

According to the embodiment shown in FIG. 1, the positioning system 100 further comprises an evaluation unit 107. The evaluation unit 107 is configured to use the second component 104b of the magnetic field to determine a compensation quantity indicating a contribution of the second magnet 101b to the first component 104a of the magnetic field.

For example, the movement of the second magnet 101b can be determined and assumed to be known. A calibration information of the second magnet may be given by simulation or measurement by using sensor 103a. By using the second component 104b, the compensation quantity can be determined. The evaluation unit 107 is further configured to determine a position of the first optical element 102a using the first component 104a of the magnetic field and the compensation quantity. The compensation quantity can be e.g. used as correction for the first component 104a. With that, a corrected first component can be determined. The corrected first component may correspond to the magnetic field generated by the first magnet 101a only. Hence, the compensation quantity can be used for determining the crosstalk of the second magnet 101b. The position of the first magnet 101a can be determined by using the compensation quantity and the first component 104a of the magnetic field. The position of the first optical element 102a can be determined by the position of the first magnet 101a.

In the embodiment referring to FIG. 1, the at least one sensor 103a is configured to detect the third component 104c of the magnetic field. For this implementation, the evaluation unit 107 is further configured to use the second component 104b of the magnetic field to determine an additional compensation quantity indicating a contribution of the second magnet 101b to the third component 104c of the magnetic field. Similar to the compensation quantity, the additional compensation quantity can be used as correction for the third component 104c. The position of the first magnet 101a can be determined by using the additional compensation quantity and the third component 104c of the magnetic field. Analogous to the compensation quantity, the evaluation unit 107 can be further configured to determine the position of the first optical element 102a using the third component 104c of the magnetic field and the additional compensation quantity.

In the following, determination of the compensation quantity and additional compensation quantity is described in further detail. By this means, the position of the first magnet 101a can be determined.

Figure 3:
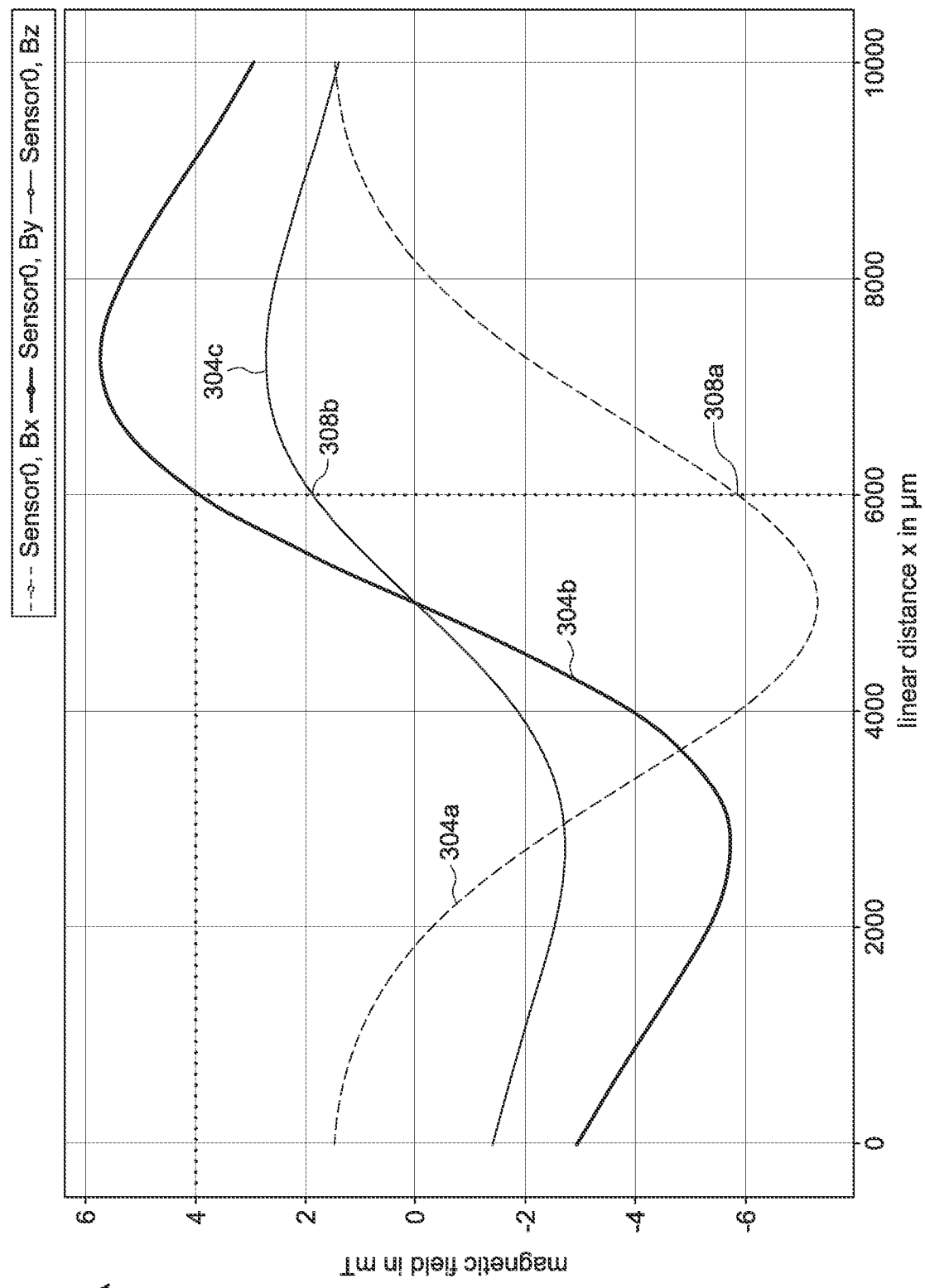
FIG. 3 illustrates an example of a calibration information of the second magnet.

According to the embodiment, the evaluation unit 107 is further configured to determine a position of the second magnet 101b by using a calibration information 300 of the second magnet and the second component 104a of the magnetic field. FIG. 3 illustrates an example of the calibration information 300 of the second magnet comprising three field components 304a-c measured by sensor 103a. The three field components 304a-c may correspond to a magnetic field generated by the second magnet 101b only.

As sensor 103a measures for the field component 204b zero value according to the calibration information 200 of the first magnet, the second component 104b of the magnetic field may comprise no contribution of the first magnet 101a. Hence, the second component 104b of the magnetic field may correspond to the field component 304b of the calibration information 300 of the second magnet. The field component 304b and the calibration information 300 of the second magnet 300 can be used to determine the position of the second magnet 101b.

Further, the evaluation unit 107 is configured to determine the compensation quantity 308a using the position of the second magnet 101b. For example, if sensor 103a measures $B_y$=4 mT for the second component 104b which is sufficiently equal to the field component 304b, the position of the second magnet 101b may equal x=6000 µm, referring to FIG. 3. According to the calibration information 300 the compensation quantity 308a may result $B_{xct1}$=−5.9 mT. The compensation quantity 308a may indicate the crosstalk component of the second magnet 101b for the first component 104a of the measured magnetic field.

According to the embodiment, the evaluation unit 107 is further configured to determine the additional compensation quantity 308b using the position of the second magnet 101b. For the previously described example comprising a second component 104b of $B_y$=4 mT, the additional compensation quantity 308b may equal $B_{zct1}$=1.9 mT according to FIG. 3. The additional compensation quantity 308a may indicate the crosstalk component of the second magnet 101b for the third component 104c of the measured magnetic field.

According to the embodiment, the evaluation unit 107 is further configured to determine the position of the first optical element 102a by using the calibration information 200 of the first magnet and at least the compensation quantity 308a. By using at least the compensation quantity 308a, a corrected magnetic field component $B_{xcor}$ can be determined. Due to superposition of magnetic fields, the correction may be calculated as follows:

$$B_{xcor}=B_x-B_{xct1}$$

Analogous, a corrected magnetic field component $B_{zcor}$ can be determined by using the additional compensation quantity 308b:

$$B_{zcor}=B_z-B_{zct1}$$

The sensors 103a-b can measure the magnetic field comprising a crosstalk of the first magnet 101a and the second magnet 101b. The second magnet 101b may have a negative crosstalk influence on the sensor 103a and the first magnet 101a may have a negative crosstalk influence on the sensor 103b.

Hence, the corrected magnetic field components $B_{xcor}$ and $B_{zcor}$ without crosstalk component can be determined by e.g. subtracting the compensation quantities $B_{xct1}$, $B_{zct1}$ from the first component $B_x$ and the third component $B_z$, respectively. The corrected magnetic field components $B_{xcor}$ and $B_{zcor}$ and the calibration information 200 of the first magnet, as shown exemplarily in FIG. 2, can be used to determine the position of the first magnet 101a. Due to the connection of the optical element 102a with the first magnet 101a, the position of the first optical element 101a can be determined by the position of the first magnet 101a.

In other embodiments, corrected magnetic field components $B_{xcor}$ and $B_{zcor}$ can be determined also according to different calculations than given in the equations described above. Other calculations may comprise further parameters e.g. considering noise or other parameters considering an influence of other technical components. Compensation quantities $B_{xct1}$ and $B_{zct1}$ may be values, vectors, matrices, tensors or functions used to determine the position of the optical elements 102a-b.

In another embodiment, the position of the first optical element 102a is determined by using only one of the corrected magnetic field components $B_{xcor}$ or $B_{zcor}$. For example, it may be sufficient to detect or use only the first component $B_x$ of the magnetic field to determine only the compensation quantity $B_{xct1}$. If the third component is not measured or used, the sensor 103a may be arranged and oriented with greater flexibility compared to the position of the first magnet 101a.

An advantage of an positioning system using both compensation quantities $B_{xcor}$ and $B_{zcor}$ can be e.g. a compensation of weak magnetic fields e.g. due to greater distances between sensor 103a and the first magnet 101a. For example, if the first component 104a of the magnetic field is small, the third component 104c can be additionally used for determining the position of the first optical element 102a more accurately. By this means, errors of determined positions can be reduced.

Similar to the determination of the position of the first optical element 102a by using the first sensor 103a, the position of the second optical element 102b can be determined by using e.g. the second sensor 103b. According to the embodiment illustrated in FIG. 1, the sensors 103a-b can be arranged and oriented symmetrically to each other. In another embodiment of a positioning system, the sensors 103a-b can be arranged asymmetrically to each other. The second sensor 103b can be arranged above, under, beside, in front of or behind the first sensor 103a. The second sensor 103b may have a different orientation compared to the orientation of the first sensor 103a.

By this means, the positioning system 100 used for e.g. a camera system of a smartphone can be reduced in size or generally adjusted in shape according to specifications. In another embodiment, the positioning system may comprise three or more optical elements with magnets. If it is sufficient, the additional compensation quantity 308b might be also used for determining the position of a third optical element.

Generally, the coordinate system is not restricted to the described embodiments and can differ in orientation, origin, type or dimension. If appropriate, the optical elements 102a-b are not restricted to a linear motion in the positioning system.

Figure 4:
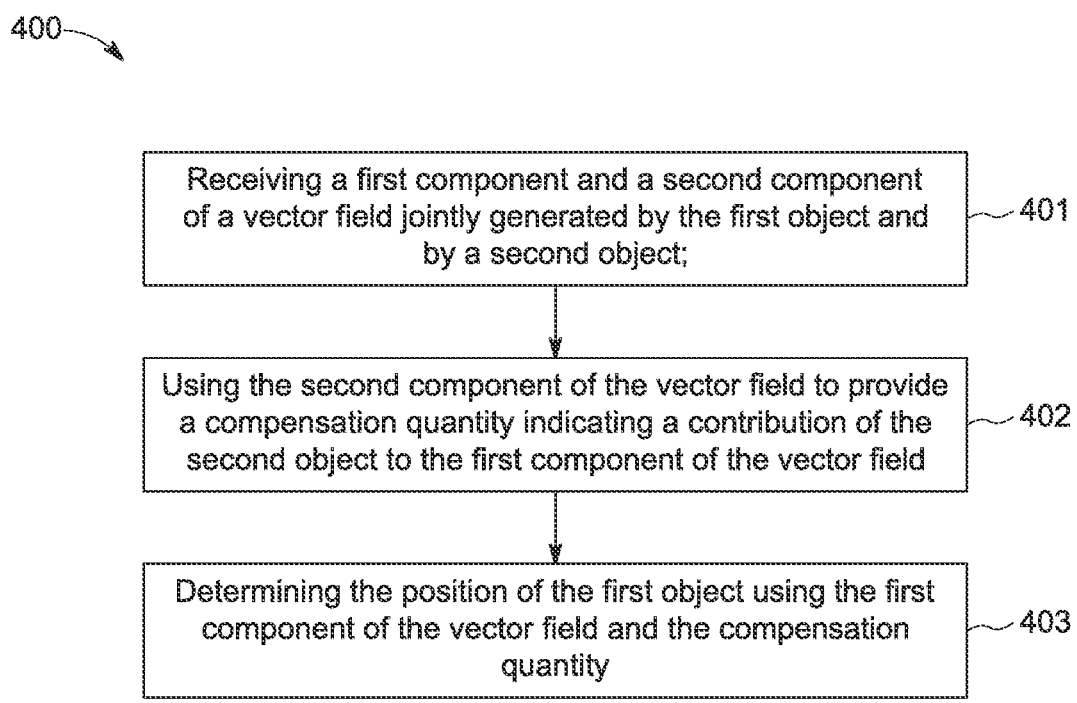
FIG. 4 illustrates a flow chart of an embodiment of a method of determining a position of a first object in the positioning system.

FIG. 4 shows a flow chart of an embodiment of a method 400 of determining a position of a first object in a positioning system. The method 400 comprises receiving a first component and a second component of a vector field jointly generated by the first object and by a second object 401. The method further comprises using the second component of the vector field to provide a compensation quantity indicating a contribution of the second object to the first component of the vector field 402. Further, the method comprises determining the position of the first object using the first component of the vector field and the compensation quantity 403.

Analogous to the previous description referring to the embodiments of the positioning system 100 in FIG. 1, the method can be used to determine the position of the first object generating a vector field. The first object can be e.g. a magnet connected to a lens, a prism, a mirror, a filter, a aperture or any arbitrary element. For example, the positioning system can be a zoom system, an imaging system, a camera system, a video system, a microscope, an endoscope, a telescope etc. The positioning system is not restricted to applications in optics and can be of arbitrary type.

According to some embodiments, the vector field corresponds to a magnetic field. In another embodiment, the vector field may correspond to an electric field. The electric field may be attributable to charges on electrodes e.g. being part of the objects. The different components of the electric field can be used to determine a crosstalk of a second object to determine the position of the first object. For the electric field, calibration information can distinguish from those based on magnetic fields, significantly.

Calibration information can be given from e.g. measurements or simulations e.g. during the development of the positioning system 100 and can be combined with an end of line compensation in the system production. If the calibration information comprises an ambiguous range the use of the calibration information can be limited. For example, FIG. 2 shows two possible distances for a given magnetic field component e.g. equal −20 mT due to symmetry. This can be considered in a system integration e.g. by limiting the range of distance for calibration. Generally, given calibration information may be different from the examples illustrated in FIG. 2 and FIG. 3. Calibration information may comprise deviations according to e.g. disturbances of the vector field or interactions between inherent components of the positioning system or with the surrounding.

Another embodiment may comprise a computer program having a program code configured to cause performing a method 400 of determining a position of a first object in an positioning system 100 if the computer program is executed by a programmable hardware component. For example, the computer program may determine positions of the objects using the received information on field components and using given calibration information. The computer program may automatically select a suitable range for calibration or may initiate a new measurement or readout if needed.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method of determining a position of a first object in a positioning system, the method comprising:
    receiving, by at least one sensor, a first component and a second component of a vector field jointly generated by the first object and by a second object;
    determining, by at least one processor, a compensation quantity indicating a contribution of the second object to the first component of the vector field, wherein the compensation quantity is determined using the second component of the vector field;
    determining, by the at least one processor, an additional compensation quantity indicating a contribution of the second object to a third component of the vector field, wherein the additional compensation quantity is determined using the second component of the vector field; and
    determining, by the at least one processor, the position of the first object using the first component of the vector field, the third component of the vector field, the compensation quantity, and the additional compensation quantity.

2. The method according to claim 1, wherein the vector field is a magnetic field.

3. The method according to claim 1, further comprising:
    determining, by the at least one processor, a position of the second object by using calibration information of the second object and the second component of the vector field; and
    determining the compensation quantity using the position of the second object.

4. The method according to claim 3, further comprising:
    determining the additional compensation quantity using the position of the second object.

5. The method according to claim 1, further comprising determining, by the at least one processor, the position of the first object by using calibration information of the first object and at least the compensation quantity.

6. A positioning system, comprising:
    a first magnet and a second magnet jointly generating a magnetic field;
    a first optical element connected to the first magnet and a second optical element connected to the second magnet;
    at least one sensor configured to detect a first component and a second component of the magnetic field; and
    an evaluation processor configured to use the second component of the magnetic field to determine a compensation quantity indicating a contribution of the second magnet to the first component of the magnetic field and to determine a position of the first optical element using the first component of the magnetic field, calibration information of the first magnet, and the compensation quantity.

7. The positioning system according to claim 6, wherein the at least one sensor is a 3D Hall sensor.

8. The positioning system according to claim 6, wherein:
    the first optical element and the second optical element are linearly movable in a predetermined direction.

9. The positioning system according to claim 8, wherein:
    the at least one sensor is displaced from the predetermined direction and oriented such that the at least one sensor is sensitive to a field component in the predetermined direction and to a field component perpendicular to the predetermined direction.

10. The positioning system according to claim 6, wherein:
    the first and the second optical elements correspond to moveable lenses configured to change a zoom or focus of the positioning system.

11. The positioning system according to claim 6, wherein:
    the at least one sensor is further configured to detect a third component of the magnetic field,
    the evaluation processor is further configured to use the second component of the magnetic field to determine an additional compensation quantity indicating a contribution of the second magnet to the third component of the magnetic field, and
    the evaluation processor is further configured to determine the position of the first optical element using the third component of the magnetic field and the additional compensation quantity.

12. The positioning system according to claim 6, wherein:
the evaluation processor is further configured to determine a position of the second magnet by using calibration information of the second magnet and the second component of the magnetic field, and
the evaluation processor is further configured to determine the compensation quantity using the position of the second magnet.

13. The positioning system according to claim 12, wherein:
the evaluation processor is further configured to determine an additional compensation quantity using the position of the second magnet.

14. A non-transitory computer-readable medium comprising a computer program having a program code for causing a programmable hardware device to execute a method of determining a position of a first object in a positioning system, the method comprising:
receiving sensor signals generated by at least one sensor, the sensor signals corresponding to measurements a first component and a second component of a vector field jointly generated by the first object and by a second object;
determining a compensation quantity indicating a contribution of the second object to the first component of the vector field, wherein the compensation quantity is determined using the second component of the vector field;
determining an additional compensation quantity indicating a contribution of the second object to a third component of the vector field, wherein the additional compensation quantity is determined using the second component of the vector field; and
determining the position of the first object using the first component of the vector field, the third component of the vector field, the compensation quantity, and the additional compensation quantity.

15. The non-transitory computer-readable medium according to claim 14, wherein the vector field is a magnetic field.

16. The non-transitory computer-readable medium according to claim 14, the method further comprising:
determining a position of the second object by using calibration information of the second object and the second component of the vector field; and
determining the compensation quantity using the position of the second object.

17. The non-transitory computer-readable medium according to claim 16, the method further comprising:
determining the additional compensation quantity using the position of the second object.

18. The non-transitory computer-readable medium according to claim 14, the method further comprising:
determining the position of the first object by using calibration information of the first object and at least the compensation quantity.

* * * * *